UNITED STATES PATENT OFFICE.

ROBERT A. FISHER, OF PHILADELPHIA, PENNSYLVANIA, ASSIGNOR TO HARRISON BROTHERS & CO., OF SAME PLACE.

MANUFACTURE OF A WHITE COMPOUND FOR PAPER-MAKER'S USE.

SPECIFICATION forming part of Letters Patent No. 223,443, dated January 13, 1880.

Application filed June 21, 1879.

*To all whom it may concern:*

Be it known that I, ROBERT A. FISHER, of the city and county of Philadelphia, and State of Pennsylvania, have invented a new and improved process for producing from kaolin, bauxite, or any other of the commonly-employed aluminous materials containing ferrous or ferric oxide, or both, a white compound for paper-maker's use consisting, essentially, of sulphate of alumina and sulphate of zinc containing more or less water, but richer in sulphate of alumina than ordinary alum, and free from any persalt of iron, and so neutral that its solution produces little or no effect upon artificial ultramarine-blue, orange mineral, the aniline dyes, and other colors used by paper-makers.

The following description will enable any one skilled in the art to which my invention most nearly appertains to carry my invention into practice.

The kaolin, bauxite, or other aluminous material is first to be treated with sulphuric acid according to any one of the usual methods for producing from these clays a solution of sulphate of alumina containing more or less iron. The solution of sulphate of alumina and iron is allowed to settle, and the clear liquor decanted into a lead-lined tank or other convenient vessel, where it is exposed to the action of a suitable reducing agent to convert any ferric oxide that may be present into ferrous oxide. Any powerful reducing agent may be employed. Nascent hydrogen produced by electrolysis or other means, sulphureted hydrogen, or sulphurous acid, either set free directly in the liquid or previously generated and then passed into the liquid, may be used for the purpose. The liquid must be subjected to the action of the reducing agent until all ferric salts present have been converted into ferrous salts. This accomplished, the next step in the process is to treat the solution with oxide of zinc, in order to completely saturate all free acid and produce a liquid that does not materially affect mineral pigments and aniline colors. This treatment can be conveniently accomplished in a wooden tank or vessel lined with lead, supplied with a steam coil or pipe, by which the contents of the vessel can be heated without diluting the same by condensed water. The liquid is first heated to a temperature of 100° Fahrenheit, more or less, and a quantity of oxide of zinc sufficient to produce the desired neutrality introduced, either in its dry state or moistened with water. The liquid is stirred during several minutes until all or a portion of the oxide of zinc has dissolved.

It now remains to test the neutrality of the solution. I find artificial ultramarine-blue to answer the purpose well.

The following is a convenient method: Dilute a few ounces of the solution to density of 12° Baumé, more or less, and bring to a temperature of 60° Fahrenheit, more or less, and place the same in a glass bottle or other convenient vessel. Add two or three grains of finely-ground ultramarine-blue and shake the bottle. If the blue color of the pigment is persistent, sufficient oxide of zinc has been employed. If, on the contrary, the color of the ultramarine-blue is affected, an additional quantity of oxide of zinc must be added to the liquid contained in the lead-lined tank and the whole again agitated. After the lapse of a few minutes a small portion of the liquid is to be again tested, as before, with ultramarine-blue. These alternate operations of adding oxide of zinc to the liquid and then testing a portion of the same with ultramarine-blue or other suitable test color must be repeated until the liquid is so neutral that it produces little or no effect on the color. As soon as this neutrality is attained and the solution is evaporated to the density of 48° Baumé, more or less, the solution is run out into shallow vessels of stone, metal, or wood.

When cool the cake is broken up into pieces, and can be dried either by prolonged exposure to the air at ordinary temperatures, or more rapidly by artificial heat.

Finally, it may be ground in a mill of any suitable construction and packed in the usual manner, or still further dried after coming from the mill or crushing-machine.

It is not essential, although advantageous, to the success of the process just described that the aluminous solution should be exposed to the action of reducing agents prior to treatment with oxide of zinc, as the aluminous solution may be first treated with oxide of zinc, and afterward with reducing agents.

Having thus described my invention, I claim—

The process for the manufacture from kaolin, bauxite, and similar aluminous earths containing iron of a white compound consisting, essentially, of sulphate of alumina and sulphate of zinc free from ferric salts, which process consists in treating a solution of sulphate of alumina with a reducing agent to convert ferric into ferrous salts, and, further, in treating said solution with oxide of zinc to neutralize the free acid in the same, substantially as described.

In testimony whereof I have hereunto set my hand this 24th day of May, 1879.

R. A. FISHER.

Witnesses:
 W. C. STRAWBRIDGE,
 J. BONSALL TAYLOR.